United States Patent
Chang et al.

(10) Patent No.: US 10,511,370 B2
(45) Date of Patent: Dec. 17, 2019

(54) METHOD FOR BEAM MANAGEMENT FOR WIRELESS COMMUNICATION SYSTEM WITH BEAMFORMING

(71) Applicant: MEDIATEK INC., Hsinchu (TW)

(72) Inventors: Ming-Po Chang, Hsinchu (TW);
Chia-Hao Yu, Hsinchu (TW);
Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/970,995

(22) Filed: May 4, 2018

(65) Prior Publication Data

US 2018/0323845 A1 Nov. 8, 2018

Related U.S. Application Data

(60) Provisional application No. 62/501,936, filed on May 5, 2017.

(51) Int. Cl.
*H04B 7/06* (2006.01)
*H04L 25/02* (2006.01)
(Continued)

(52) U.S. Cl.
CPC ......... *H04B 7/0617* (2013.01); *H04B 7/0626* (2013.01); *H04B 7/0695* (2013.01);
(Continued)

(58) Field of Classification Search
CPC .. H04B 7/0617; H04B 7/0452; H04B 7/0626; H04B 7/0695; H04B 7/088;
(Continued)

(56) References Cited

U.S. PATENT DOCUMENTS

| | | | |
|---|---|---|---|
| 2015/0341092 A1 | 11/2015 | Park et al. | 370/329 |
| 2016/0050006 A1 | 2/2016 | Ko et al. | 370/329 |

(Continued)

FOREIGN PATENT DOCUMENTS

| | | |
|---|---|---|
| CN | 105432026 A | 7/2013 |
| EP | 2961216 A1 | 2/2013 |
| WO | WO2014171658 A1 | 4/2013 |

OTHER PUBLICATIONS

International Search Report and Written Opinion of International Search Authority for PCT/CN2018/085826 dated Jun. 29, 2018 (9 pages).

(Continued)

*Primary Examiner* — Khanh C Tran
(74) *Attorney, Agent, or Firm* — Imperium Patent Works; Zheng Jin

(57) ABSTRACT

A method of group-based beam reporting is proposed. The BS TX beams are grouped into groups to increase beam reporting efficiency. After measuring reference signals for beam management, UE reports RS quality to the network in beam groups. The beam grouping can be done either implicitly or explicitly. The grouping within the beam report is done by the UE with or without help from the network. According to principles of grouping mechanism, the grouping methods can be divided into two different categories. A first category is referred to as beam set based group, where UE groups TX beam information in a beam report based on its RX beam set(s). A second category is referred to as antenna group-based grouping, where UE groups TX beam information in a beam report based on UE antenna group.

20 Claims, 7 Drawing Sheets

(51) Int. Cl.
*H04W 24/10* (2009.01)
*H04B 7/08* (2006.01)

(52) U.S. Cl.
CPC ...... *H04L 25/0204* (2013.01); *H04L 25/0224* (2013.01); *H04B 7/088* (2013.01); *H04W 24/10* (2013.01)

(58) Field of Classification Search
CPC .. H04B 7/0408; H04B 7/0417; H04B 7/0632; H04B 7/0689; H04L 25/0204; H04W 24/10; H04W 16/28; H04W 72/1226; H04W 52/0245
See application file for complete search history.

(56) References Cited

U.S. PATENT DOCUMENTS

| | | | |
|---|---|---|---|
| 2016/0150435 A1* | 5/2016 | Baek | H04W 16/28 370/252 |
| 2016/0173183 A1 | 6/2016 | Kang et al. | 455/562.1 |
| 2017/0257884 A1* | 9/2017 | Rahman | H04B 7/0626 |
| 2018/0115958 A1* | 4/2018 | Raghavan | H04B 7/0478 |
| 2018/0255607 A1* | 9/2018 | Nagaraja | H04W 76/28 |

OTHER PUBLICATIONS

R1-1704549 3GPP TSG RAN WG1 Meeting #88bis, CATT, "Discussion on multi-panel/multi-TRP transmission", Spokane, USA, Apr. 3-7, 2017 (5 pages).
The Taiwan IPO, office action for the TW patent application 107115260 (no English translation is available) dated May 22, 2019 (10 pages).
R1-1701714 3GPP TSG RAN WG1 Meeting #88, Huawei et al., "Discussion on downlink beam measurement and UE reporting procedure", Athens, Greece dated Feb. 13-17, 2017.
R1-1701798 3GPP TSG RAN WG1 Meeting #88, Zte et al., "Group based beam management for NR-MIMO", Athens, Greece dated Feb. 13-17, 2017.
R1-1703160 3GPP TSG-RAN WG1 #88, Nokia et al., "On beam grouping reporting in NR", Athens, Greece dated Feb. 13-17, 2017.

* cited by examiner

| VAUE OF K | |
|---|---|
| TX BEAM IDENTIFIER #1 | VALUE METRIC #1 |
| TX BEAM IDENTIFIER #2 | VALUE METRIC #2 |
| ... | |
| TX BEAM IDENTIFIER #K | VALUE METRIC #K |
| TX BEAM IDENTIFIER #K+1 | VALUE METRIC #K+1 |
| ... | |
| TX BEAM IDENTIFIER #2K | VALUE METRIC #2K |
| ... | ... |
| TX BEAM IDENTIFIER #N | VALUE METRIC #N |

| GROUP ID | BEAM ID | VALUE METRIC |
|---|---|---|
| 1 | 1 | VALUE #1 |
| | 2 | VALUE #2 |
| | 3 | VALUE #3 |
| 2 | 4 | VALUE #4 |
| | 5 | VALUE #5 |
| | 6 | VALUE #6 |
| 3 | 7 | VALUE #7 |
| | 8 | VALUE #8 |

METHOD FOR BEAM MANAGEMENT FOR WIRELESS COMMUNICATION SYSTEM WITH BEAMFORMING

CROSS REFERENCE TO RELATED APPLICATIONS

This application claims priority under 35 U.S.C. § 119 from U.S. Provisional Application No. 62/501,936, entitled "Method for Beam Management for Wireless Communication System with Beamforming," filed on May 5, 2017; the subject matter of which is incorporated herein by reference.

TECHNICAL FIELD

The disclosed embodiments relate generally to wireless communication, and, more particularly, to beam management and reporting in a Millimeter Wave (mmWave) beamforming system.

BACKGROUND

The bandwidth shortage increasingly experienced by mobile carriers has motivated the exploration of the underutilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

Analog beamforming is a good candidate for application in mmWave beamforming wireless systems. It provides array gain for compensating severe pathloss due to harsh wireless propagation environment and removes the need for training channel response matrix between multiple antenna elements at TX/RX sides. Different beamformers can have different spatial resolution. For example, a sector antenna can have shorter by wider spatial coverage, while a beamforming antenna can have longer by narrower spatial coverage. To provide moderate array gain, large number of array elements may be needed. In principle, beam training mechanism, which includes both initial beam alignment and subsequent beam tracking, ensures that base station (BS) beam and user equipment (UE) beam are aligned for data communication.

In downlink DL-based beam management, the BS side provides opportunities for UE to measure beamformed channel of different combinations of BS beams and UE beams. For example, BS performs periodic beam sweeping with reference signal (RS) carried on individual BS beams. UE can collect beamformed channel state by using different UE beams and report the collect information to BS. Similarly, in uplink UL-based beam management, the UE side provides opportunities for BS to measure beamformed channel of different combinations of UE beams and BS beams. For example, UE performs periodic beam sweeping with reference signal (RS) carried on individual UE beams. BS can collect beamformed channel state by using different BS beams and report the collect information to UE.

Beam reporting is thus an essential part of channel state information feedback and beam reporting mechanism needs to be determined.

SUMMARY

A method of group-based beam reporting is proposed. The BS TX beams are grouped into groups to increase beam reporting efficiency. After measuring reference signals for beam management, UE reports RS quality to the network in beam groups. The beam grouping can be done either implicitly or explicitly. The grouping within the beam report is done by the UE with or without help from the network. According to principles of grouping mechanism, the grouping methods can be divided into two different categories. A first category is referred to as beam set based group, where UE groups TX beam information in a beam report based on its RX beam set(s). A second category is referred to as antenna group-based grouping, where UE groups TX beam information in a beam report based on UE antenna group.

In one embodiment, a UE receives reference signals over a plurality of TX beams from a base station by a user equipment (UE) in a beamforming wireless communication network. Each TX beam has a TX beam identifier. The UE performs measurements over the plurality of TX beams and determining a corresponding beam value metric. The UE groups the plurality of TX beams into multiple beam groups. The grouping is determined based on an association between each TX beam and a number of UE receive panels or UE antenna subarrays. The UE reports the beam value metrics of the plurality of TX beams in an order associated with each beam group.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
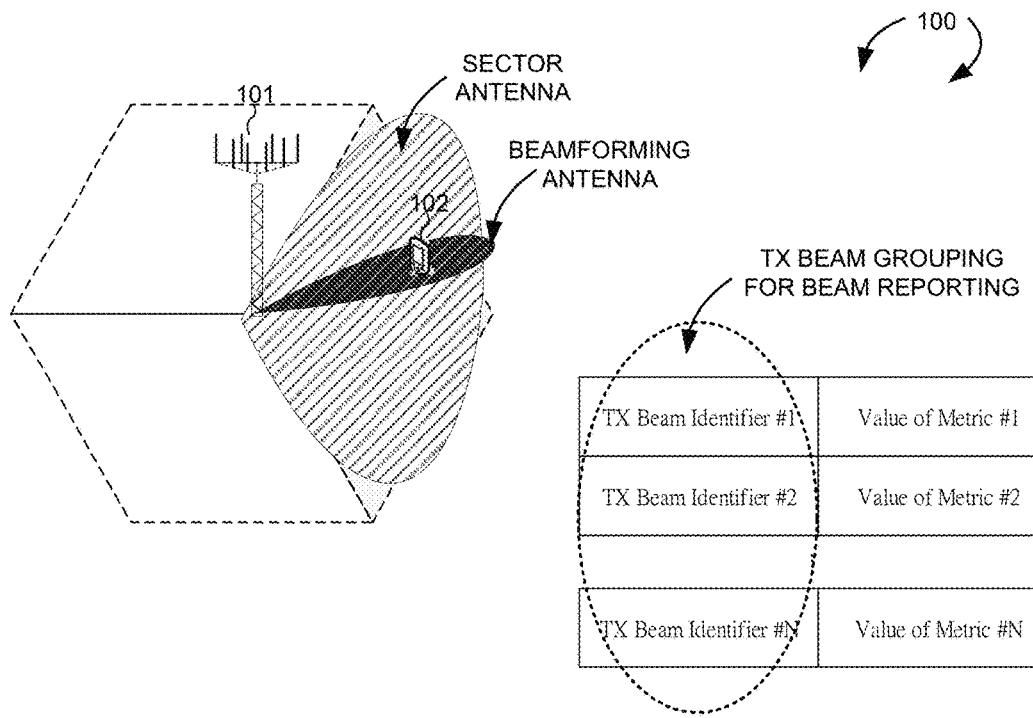
FIG. 1 illustrates a Millimeter Wave beamforming wireless communication system with beam management and beam reporting in accordance with one novel aspect.

FIG. 1 illustrates a Millimeter Wave beamforming wireless communication system 100 with beam management and beam reporting in accordance with one novel aspect. Beamforming mmWave mobile communication network 100 comprises a base station BS 101 and a user equipment UE 102. The mmWave cellular network uses directional communication with narrow beams and can support multi-gigabit data rate. Directional communication is achieved via digital and/or analog beamforming, wherein multiple antenna elements are applied with multiple sets of beamforming weights to form multiple beams. Analog beamforming is a good candidate for application in mmWave beamforming wireless systems. It provides array gain for compensating severe pathloss due to harsh wireless propagation environment and removes the need for training channel response matrix between multiple antenna elements at TX/RX sides. Different beamformers can have different spatial resolution, i.e., beamwidth. For example, a sector antenna can form beams having lower array gain but wider spatial coverage, while a beamforming antenna can have higher array gain but narrower spatial coverage. To provide moderate array gain, however, a large number of array elements may be needed.

In downlink DL-based beam management, the BS side provides opportunities for UE to measure beamformed channel of different combinations of BS TX beams and UE RX beams. For example, BS performs periodic beam sweeping with reference signal (RS) carried on individual BS TX beams. UE can collect beamformed channel state by using different UE RX beams and report the collected information to BS. In the example of FIG. 1, after measuring RSs for beam management, UE reports N TX beam identifiers and their corresponding measurement metric(s). The N TX beams are determined based on current and/or past measurement results and configured principle, where N is a positive integer. N can be determined by a network configured threshold, e.g., UE reports all TX beams whose measurement metric is higher than the configured threshold. The TX beam identifier can be, e.g., resource ID (CSI-RS resource ID, a.k.a. CRI), sequence, or time index. The measurement metric(s) can be, e.g., reference signal received power (RSRP), or channel state information (CSI), or both.

In according with one novel aspect, the BS TX beams are grouped into groups to increase beam reporting efficiency.

After measuring RSs for beam management, UE reports RS quality to the network (NW) in groups. Beam grouping can be done either implicitly or explicitly. For implicit grouping, the beam groups are formed without group identifiers in beam reporting. For example, the UE reports N TX beams and uses another field in the beam report to indicate the number of beams (K) per beam group. For explicit grouping, M beam groups are formed and each beam group is associated with a group identifier, the $m^{th}$ beam group contains $N_m$ number of beams. M is configured by the network through MAC CE or RRC message, and $N_m$ can be determined by NW configuration, comparing measurement metrics to a NW-configured threshold, or UE capability. The grouping within the beam report is done by the UE with or without help from the network.

Figure 2:
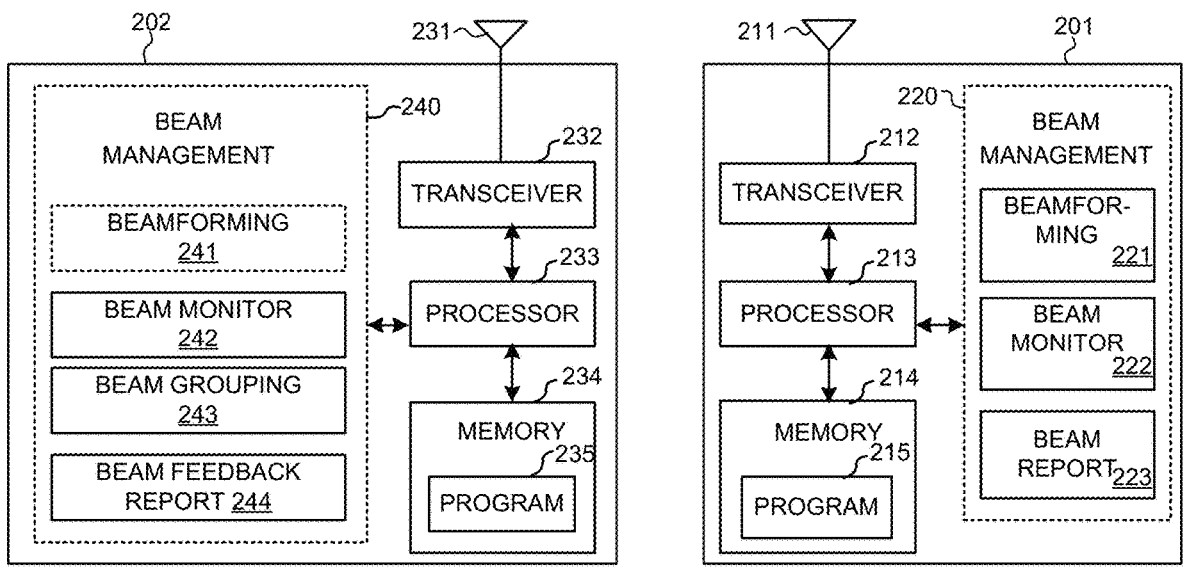
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a beam management module 220, which further comprises a beamforming circuit 221, a beam monitor 222, and a beam reporting circuit 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various UE beams. Beam reporting circuit 223 reports the beam monitoring results for each received UE beam.

Similarly, UE 202 comprises a beam management module 240, which further comprises a beamforming circuit 241, a beam monitor 242, a beam grouping circuit 243, and a beam feedback circuit 244. Beamforming circuit 241 may belong to part of the RF chain, which applies various beamforming weights to multiple antenna elements of antenna 231 and thereby forming various beams. Beamforming circuit 241 is optional for UE side, because UE 202 can use omni beam instead. Beam monitor 242 monitors received radio signals and performs measurements of the radio signals over the various beams. Beam grouping circuit groups different BS beams into beam groups based on certain criteria. Beam feedback circuit 244 provide beam quality metric and send report to BS 201 in beam groups based on the beam monitoring results for each BS beam.

Figures 3, 4:
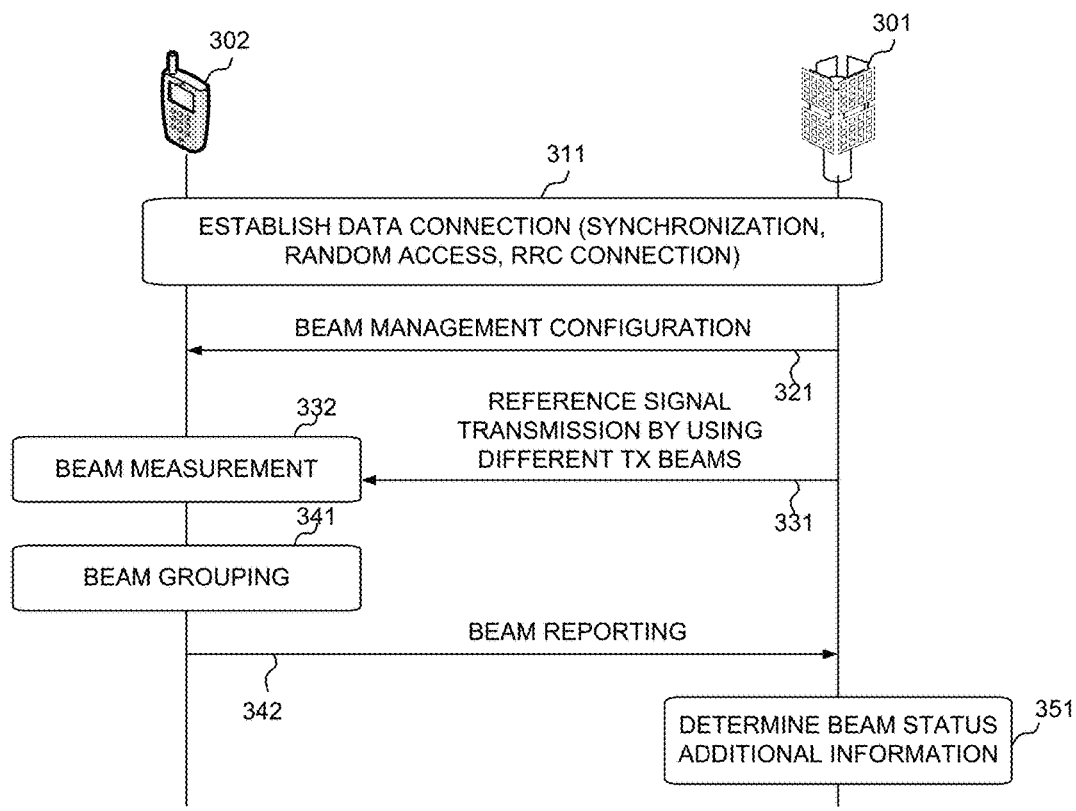
FIG. 3 illustrates a procedure for beam management with beam reporting in beam groups in accordance with one novel aspect.
FIG. 4 illustrates examples of different beam grouping methods for beam reporting.

FIG. 3 illustrates a procedure for beam management with beam reporting in beam groups in accordance with one novel aspect. BS 301 is directionally configured with multiple cells, and each cell is covered by a set of coarse TX/RX control beams. Initially, UE 302 performs scanning, beam selection, and synchronization with BS 301 using the control beams. In step 311, BS 301 and UE 302 established a data connection over a trained dedicated data beam based on a beam training operation (after performing synchronization, random access, and RRC connection establishment). In step 321, BS 301 provides beam management configuration to UE 302. The beam management configuration comprises CSI-RS resource configuration, beam report setting, etc. In step 331, BS 301 periodically transmits downlink reference signals to UE 302 using different TX beams. Based on the reference signal transmission, UE 302 recursively monitors and measures the TX beams for its RSRP and/or CSI metric (step 332). In step 341, UE 302 groups the different TX beams based on a certain beam grouping method. In step 341, UE 302 transmits group-based beam report to BS 301. In step 351, BS 301 determines different TX beam status based on the beam report, constructed with or without additional information.

FIG. 4 illustrates examples of different beam grouping methods for beam reporting. For implicit beam grouping, the beam groups are formed without group identifiers in beam reporting. As depicted by table 410, the UE reports N TX beams and uses another field in the beam report to indicate the number of beams (K) per beam group. For explicit grouping, M beam groups are formed and each beam group is associated with a group identifier, the $m^{th}$ beam group contains $N_m$ number of beams. As depicted by table 420, three beam groups are formed among N=8 TX beams, group 1 contains three beams 1-3, group 2 contains three beams 4-6, and group 3 contains two beams 7-8. M is configured by the network through MAC CE or RRC message, and $N_m$ can be determined by NW configuration, comparing measurement metrics to a NW-configured threshold, or UE capability.

The grouping within the beam report is done by the UE with or without help from the network. According to principles of grouping mechanism, the grouping methods can be divided into two different categories. A first category is referred to as beam set based group, where UE groups TX beam information in a beam report based on its RX beam set(s). A second category is referred to as antenna group-based grouping, where UE groups TX beam information in a beam report based on UE antenna group.

Figures 5, 6A:
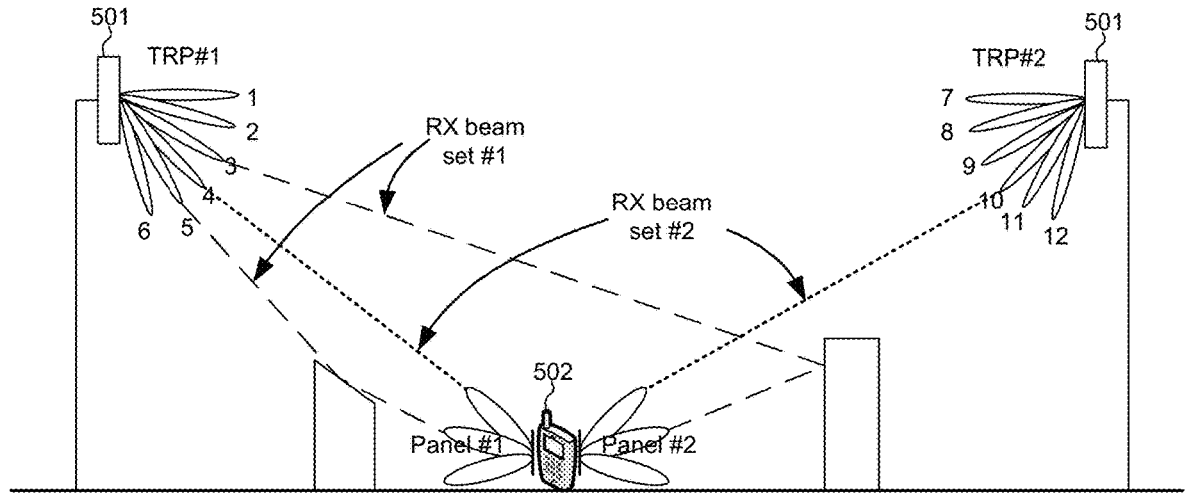
FIG. 5 illustrates a first embodiment of beam set based grouping in a beamforming network with UEs having multiple receive panels or antenna subarrays.
FIG. 6A illustrates examples of beam set based grouping for beam reporting with additional information.

FIG. 5 illustrates a first embodiment of beam set based grouping in a beamforming network with UEs having multiple receive panels or antenna subarrays. In beam set based grouping, UE groups TX beam information in a beam report based on its RX beam set(s). RX beam set refers to a set of UE RX beams that are used for downlink signal reception. RX beam set is constructed by UE implementation and is transparent to the network. For example, each beam in one RX beam set corresponds to a selected beam in each UE receive panel or antenna subarray. Based on such grouping, the TX beams reported in one beam group for the same RX beam set can be received simultaneously at the UE. On the other hand, TX beams reported in different beam groups for different RX beam sets may not possibly be received simultaneously at the UE.

In the example of FIG. 5, BS 501 has two transmission points (TRPs) and twelve TX beams, beams #1-6 are transmitted from a first TRP#1, and beams #7-12 are transmitted from a second TRP#2. UE 502 has two receive panels—UE panel#1 and UE panel#2, and constructs RX beam sets by select TX beams corresponds to each UE panel. Each TX beam in one RX beam set corresponds to a selected beam in each UE panel. For example, TX beams #3 and #5 belong to a first RX beam set, while TX beams #4 and #10 belong to a second RX beam set. This is because TX beam #3 corresponds to UE panel#2 and TX beam #5 corresponds to UE panel#1. Similarly, TX beam #4 corresponds to UE panel#1 and TX beam #10 corresponds to UE panel#2. As a result, UE 502 can receive TX beams #3 and #5 belonging to RX beam set #1 simultaneously and can receive TX beams #4 and #10 belonging to RX beam set #2 simultaneously.

FIG. 6A illustrates examples of beam set based grouping for beam reporting with additional information. To facilitate beam set based grouping and reporting, additional information can be utilized. In a first example, with additional information, UE is able to construct beam groups of TX beams that 1) are able to be transmitted simultaneously at NW; and 2) are able to be received simultaneously at UE for group-based beam reporting. The additional information can be 1) explicit or implicit TX beam grouping information from NW through RRC message or MAC CE or DCI; 2) NW capability such as the number of TX beams from a TRP; 3) hidden assumption such as TX beams received by the UE at the same time on different radio resources can be assumed to be able to be transmitted simultaneously at NW. The additional information can be configured through RRC message together with beam management resource configuration—for example, all CSI-RS resources in a CSI-RS resource set are transmitted with TX beams that are able to be transmitted simultaneously at NW. The additional information can also be configured through RRC message indicating NW capability—for example, the number of TX beams from a TRP. Referring back to FIG. 5, TX beams #3 and #5 belong to RX beam set #1, but BS 501 cannot transmit those beams simultaneously from the same TRP#1. TX beams #4 and #10 belong to RX beam set #2, and BS 501 can transmit those beams simultaneously from different TRP#1 and TRP#2.

In a second example, with the additional information, the network is able to get antenna group information from the beam set based grouping and the corresponding beam report. As depicted by table 610, the additional information can be assumption that the first X TX beams in each beam group form an antenna group respectively. In table 610, three groups 1, 2, and 3 are reported by the UE in the beam report. Beam group 1 contains TX beams #1 and #2, beam group 2 contains TX beams #3 and #7, and beam group 3 contains TX beams #4 and #8. As a result, the first TX beams #1, #3, and #4 from each beam group 1, 2, and 3, respectively form a first antenna group. The second TX beams #2, #7, and #8 from each beam group 1, 2, and 3, respectively from a second antenna group. If a beam group does not have TX beam which belongs to antenna group K, then 0/NULL can be reported for the $K^{th}$ TX beam, as depicted by table 620. For example, beam group 1 does not have TX beam belongs to antenna group 3, and 0 is reported for the third TX beam in beam group 1. The additional information can be an existed assumption and no configuration is needed, e.g., X is a constant (X=1). The additional information can also be configured through RRC message using a field to indicate whether the assumption is on or off, e.g., X is a constant or indicate X in beam report configuration.

In a third example, with the additional information, the network is able to recognize UE's preference among reported beam groups and TX beams based on their positions in the beam report. The additional information can be 1) the position of group in the beam report, and/or 2) the position of TX beam in each group that indicates the preference of the UE. In one example, UE prefers group 1 over group 2. In another example, if two out of three TX beams need to be selected within a group, and UE preference is the first two TX beams reported in the group. The additional information can be an existed assumption and no configuration is needed. The additional information can also be configured through RRC message using a field to indicate whether the assumption is on or off. Note that all the different additional information illustrated above can be utilized simultaneously.

Figure 6B:
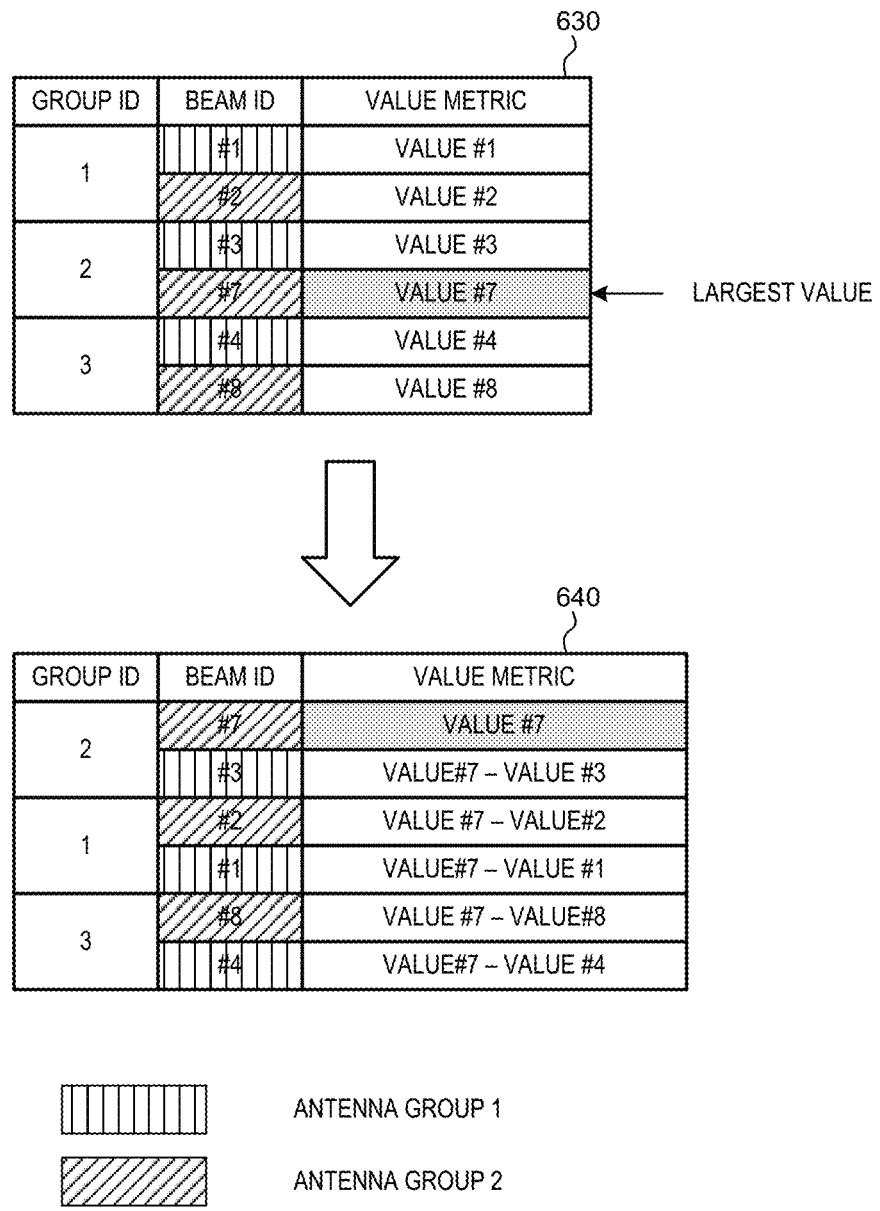
FIG. 6B illustrates beam set based grouping with differential beam reporting and combination of additional information.

FIG. 6B illustrates beam set based grouping with differential beam reporting and combination of additional information. Differential reporting is utilized to reduce the size of the beam report. When there are N beams and N metric values in the report, if differential reporting is not applied, the N reported values are the quantized values based on UE measurements. Each of the values are represented by, e.g., 7 bits. The 7-bit representation can be mapped to an absolute metric value. If differential reporting is applied, then one reference value and N−1 differential values are reported. The reference value can be the largest or the smallest value among the N values, and the reference value is represented by full bit width, e.g., 7 bits as exemplified above. The reference value (beam) can be indicated by the position in a reporting instance, e.g., the first beam in the first group in the beam report, or the last beam in the last group. The N−1 differential values are the differences between the N−1 original values and the reference value. The differential values have smaller bit width, e.g., 4 bits. In the example of Table 630, beam #7 and value #7 is the largest value and the reference value.

Table 640 illustrates the use of different additional information with differential reporting at the same time. In the example of Table 640, beam set group with ID 2 is the most preferred group based on its position of the beam report. The first beam in each group (beam #7, #2, and #8) belongs to the same antenna group while the second beam in each group (beam #3, #1, and #4) belongs to another antenna group. The metric value of each beam can be derived from the difference with respect to the reference value (i.e., the first value in the beam report, value #7). The reference value is reported as the first beam (beam #7) in group 2.

Figures 7, 8A:
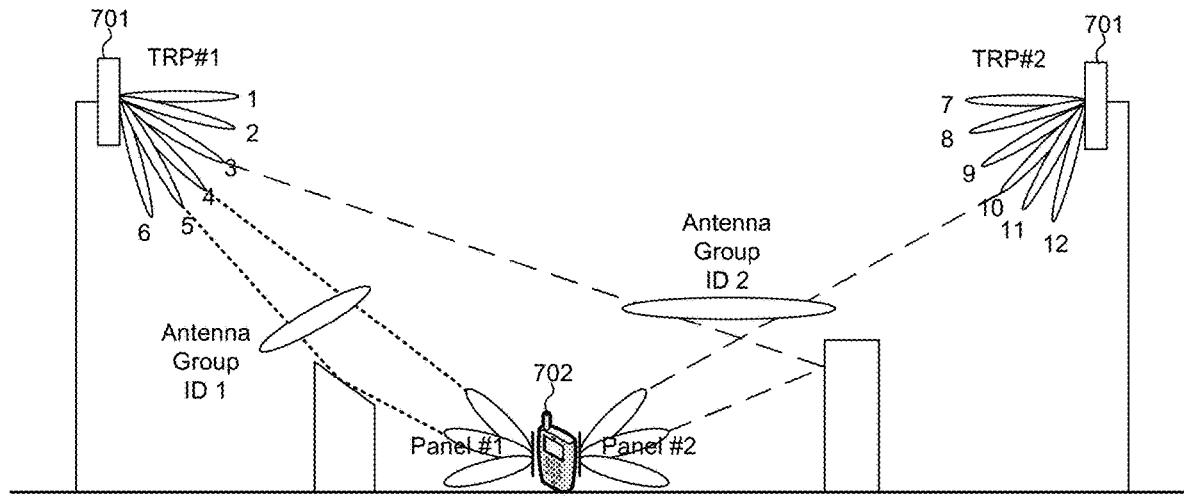
FIG. 7 illustrates a second embodiment of antenna group-based grouping in a beamforming network with UEs having multiple receive panels or antenna subarrays.
FIG. 8A illustrates examples of antenna group-based grouping for beam reporting with additional information.

FIG. 7 illustrates a second embodiment of antenna group-based grouping in a beamforming network with UEs having multiple receive panels or antenna subarrays. In antenna group-based grouping, UE groups TX beam information in a beam report based on UE antenna group(s). UE antenna group refers to UE receive panel or antenna subarray. Based on such grouping, the TX beams reported in one group for the same UE antenna group may not possibly be received simultaneously at the UE. On the other hand, the TX beams reported in different groups for different UE antenna groups can be received simultaneously at the UE.

In the example of FIG. 7, BS 701 has two TRPs and twelve TX beams, beams #1-6 are transmitted from a first TRP#1, and beams #7-12 are transmitted from a second TRP#2. UE 702 has two receive panels—UE panel#1 and UE panel#2, and therefore constructs two antenna groups—antenna group 1 and antenna group 2, respectively. For example, TX beams #3 and #10 belong to antenna group 2, while TX beams #4 and #5 belong to antenna group 1. This is because TX beams #3 and #10 can be received at the UE via UE panel#2, TX beams #4 and #5 can be received at the UE via UE panel#1. As a result, UE 702 cannot receive TX beams #3 and #10 belonging to antenna group 2 simultaneously, UE 702 also cannot receive TX beams #4 and #5 belonging to antenna group 1 simultaneously. However, UE 702 can receive TX beams reported in different antenna groups simultaneously, e.g., TX beams #10 and #4.

FIG. 8A illustrates examples of antenna group-based grouping for beam reporting with additional information. To facilitate antenna group-based grouping and reporting, additional information can be utilized. In a first example, with additional information, the network is able to identify RX beam set information from the antenna group-based grouping and the corresponding beam report. As depicted by table 810, the additional information can be assumption that the first X TX beams in each beam group form an RX beam set respectively. The first X TX beam in each group are thus the suggested TX beams for simultaneous transmission by UE. In table 810, two groups 1 and 2 are reported by the UE in the beam report. Beam group 1 contains TX beams #1, #3, and #4, beam group 2 contains TX beams #2, #7 and #8. As a result, the first TX beams #1 and #2 from beam group 1 and 2 respectively form a first RX beam set; the second TX beams #3 and #7 from beam group 1 and 2 respectively form a second RX beam set; and the third TX beams #4 and #8 from beam group 1 and 2 respectively form a third RX beam set. If the $K^{th}$ TX beam in a group does not belong to RX beam set based group K, then 0/NULL can be reported for the $K^{th}$ TX beam, as depicted by table 820. For example, the second TX beam of beam group 3 does not belong to beam set based group 2, and 0 is reported for the second TX beam in antenna-based beam group 3. The additional information can be an existed assumption and no configuration is needed, e.g., X is a constant (X=1). The additional information can also be configured through RRC message using a field to indicate whether the assumption is on or off, e.g., X is a constant or indicate X in beam report configuration.

In a second example, with the additional information, the network is able to recognize UE's preference among reported beam groups and TX beams based on their positions in the beam report. The additional information can be 1) the position of group in the beam report, and/or 2) the position of TX beam in each group that indicates the preference of the UE. In the example of Table 820, beam #1, #2, #5 can be received simultaneously. If the network aims at selecting only two beams for later transmission, TX beams in group 1 and group 2 (e.g., beam #1 and #2) are suggested by the UE. The additional information can be an existed assumption and no configuration is needed. The additional information can also be configured through RRC message using a field to indicate whether the assumption is on or off. Note that all the different additional information illustrated above can be utilized simultaneously.

Figure 8B:
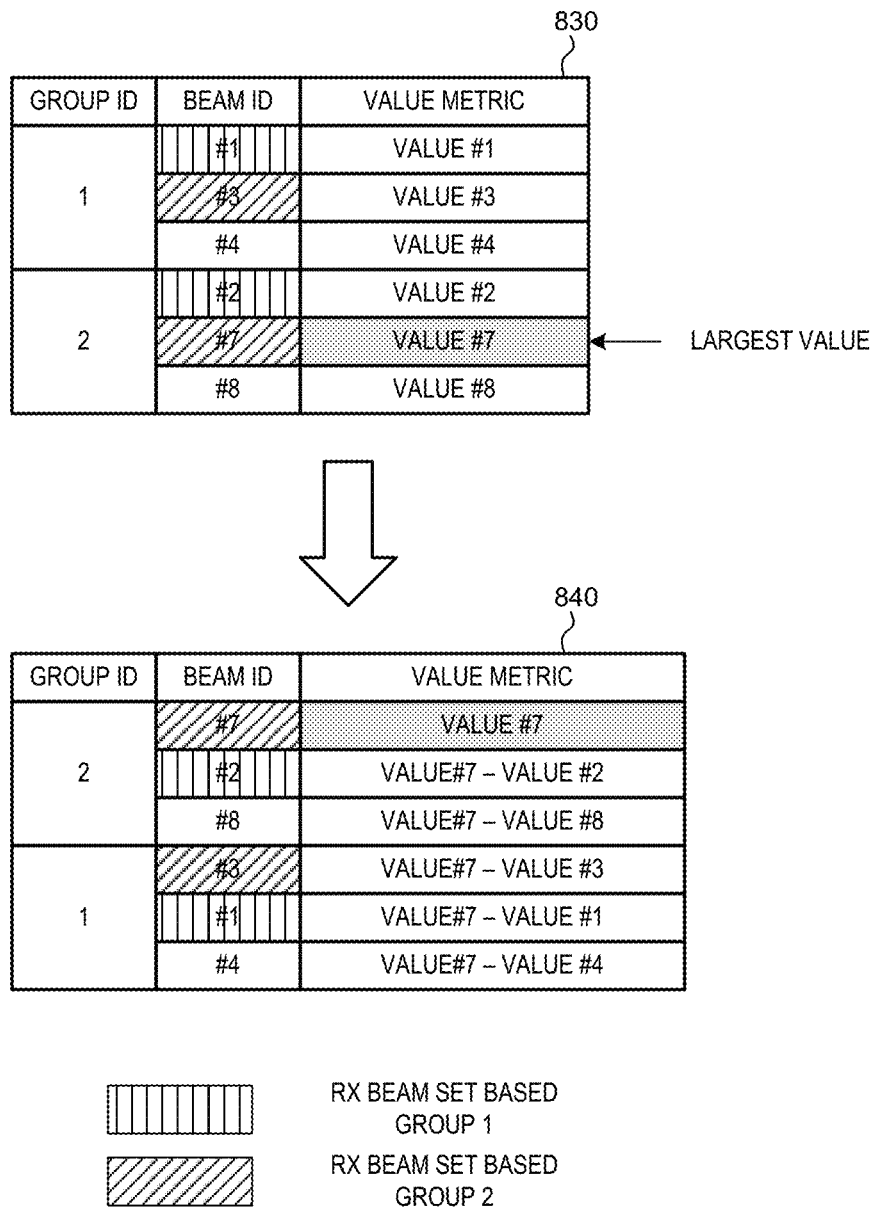
FIG. 8B illustrates antenna group-based grouping with differential beam reporting and combination of additional information.

FIG. 8B illustrates antenna group-based grouping with differential beam reporting and combination of additional information. Differential reporting is utilized to reduce the size of the beam report. When there are N beams and N metric values in the report, if differential reporting is not applied, the N reported values are the quantized values based on UE measurements. Each of the values are represented by, e.g., 7 bits. The 7-bit representation can be mapped to an absolute metric value. If differential reporting is applied, then one reference value and N−1 differential values are reported. The reference value can be the largest or the smallest value among the N values, and the reference value is represented by full bit width, e.g., 7 bits as exemplified above. The reference value (beam) can be indicated by the position in a reporting instance, e.g., the first beam in the first group in the beam report, or the last beam in the last group. The N−1 differential values are the differences between the N−1 original values and the reference value. The differential values have smaller bit width, e.g., 4 bits. In the example of Table 830, beam #7 and value #7 is the largest value and the reference value.

Table 840 illustrates the use of different additional information with differential reporting at the same time. In the example of Table 840, the first beam in each group (beam #7, #3) belongs to the same RX beam set group while the second beam in each group (beam #2, #1) belongs to another RX beam set group. The metric value of each beam can be derived from the difference with respect to the reference value (i.e., the first value in the beam report, value #7). The reference value is reported as the first beam (beam #7) in antenna group 2.

Figure 9:
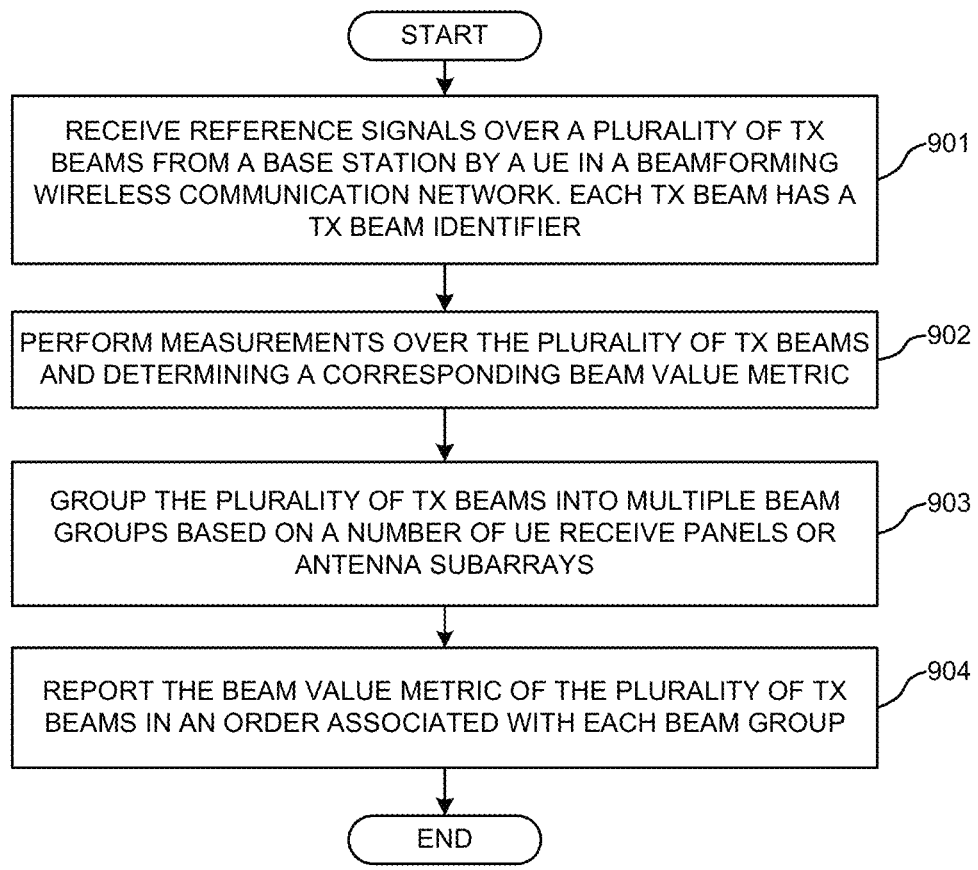
FIG. 9 is a flow chart of a method of beam reporting from UE perspective in a beamforming system in accordance with one novel aspect.

FIG. 9 is a flow chart of a method of group-based beam reporting from UE perspective in a beamforming system in accordance with one novel aspect. In step 901, a UE receives reference signals over a plurality of TX beams from a base station by a user equipment (UE) in a beamforming wireless communication network. Each TX beam has a TX beam identifier. In step 902, the UE performs measurements over the plurality of TX beams and determining a corresponding beam value metric. In step 903, the UE groups the plurality of TX beams into multiple beam groups. The grouping is determined based on an association between each TX beam and a number of UE receive panels or UE antenna subarrays. In step 904, the UE reports the beam value metrics of the plurality of TX beams in an order associated with each beam group. In one embodiment, UE groups TX beam information in a beam report based on its RX beam set(s). In another embodiment, UE groups TX beam information in a beam report based on its antenna group—e.g., receive panel/subarray.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving reference signals over a plurality of TX beams from a base station by a user equipment (UE) in a beamforming wireless communication network, wherein each TX beam has a TX beam identifier;
performing measurements over the plurality of TX beams and determining a corresponding beam metric value;
grouping the plurality of TX beams into multiple beam groups, wherein the grouping is determined based on an association between each TX beam and a number of UE receive panels or UE antenna subarrays; and
reporting the beam value metrics of the plurality of TX beams in an order associated with each beam group, wherein each beam group is implicitly indicated by a number of TX beams per beam group, or explicitly indicated by a beam group identifier.

2. The method of claim 1, wherein the TX beam identifier is associated with a reference signal resource ID, a sequence, or a time index.

3. The method of claim 1, wherein the beam metric value is associated with a reference signal received power (RSRP) and/or a channel state information (CSI) of the corresponding TX beam.

4. The method of claim 1, wherein the UE is able to receive TX beams in a same beam group simultaneously, and wherein the UE is not able to receive TX beams in different beam groups simultaneously.

5. The method of claim 4, wherein the UE receives additional information from the base station such that TX beams in a same beam group can be transmitted by the base station simultaneously.

6. The method of claim 4, wherein a position of each TX beam in each beam group of the reporting indicates a UE receive panel/antenna subarray and/or a UE preference of the corresponding TX beam.

7. The method of claim 1, wherein TX beams in a same beam group belong to a UE receive panel or antenna subarray, and wherein TX beams in different beam groups belong to different UE receive panels or antenna subarrays.

8. The method of claim 7, wherein the reporting indicates that each TX beam having a same position in each beam group can be simultaneously received by the UE.

9. The method of claim 7, wherein a position of each TX beam in the reporting indicates a UE preference of the corresponding TX beam.

10. The method of claim 1, wherein the UE selects one TX beam as a reference beam having a reference metric value, and wherein the UE reports differential metric values with respect to the reference metric value for other TX beams.

11. A user equipment (UE), comprising:
a radio frequency (RF) receiver that receives reference signals over a plurality of TX beams from a base station in a beamforming wireless communication network, wherein each TX beam has a TX beam identifier;
a beam monitoring circuit that performs measurements over the plurality of TX beams and determining a corresponding beam value metric;
a beam grouping circuit that groups the plurality of TX beams into multiple beam groups, wherein the grouping is determined based on an association between each TX beam and a number of UE receive panels or UE antenna subarrays; and
a beam feedback circuit that reports the beam value metrics of the plurality of TX beams in an order associated with each beam group, wherein each beam group is implicitly indicated by a number of TX beams per beam group, or explicitly indicated by a beam group identifier.

12. The UE of claim 11, wherein the TX beam identifier is associated with a reference signal resource ID, a sequence, or a time index.

13. The UE of claim 11, wherein the UE is able to receive TX beams in a same beam group simultaneously, and wherein the UE is not able to receive TX beams in different beam groups simultaneously.

14. The UE of claim 13, wherein the UE receives additional information from the base station such that TX beams in a same beam group can be transmitted by the base station simultaneously.

15. The UE of claim 13, wherein a position of each TX beam in each beam group of the reporting indicates a UE receive panel/antenna subarray and/or a UE preference of the corresponding TX beam.

16. The UE of claim 11, wherein TX beams in a same beam group belong to a UE receive panel or antenna subarray, and wherein TX beams in different beam groups belong to different UE receive panels or antenna subarrays.

17. The UE of claim 16, wherein the reporting indicates that each TX beam having a same position in each beam group can be simultaneously received by the UE.

18. The UE of claim 16, wherein a position of each TX beam in the reporting indicates a UE preference of the corresponding TX beam.

19. The UE of claim 11, wherein the UE selects one TX beam as a reference beam having a reference metric value, and wherein the UE reports differential metric values with respect to the reference metric value for other TX beams.

20. The UE of claim 11, wherein the beam value metric is associated with a reference signal received power (RSRP) and/or a channel state information (CSI) of the corresponding TX beam.

* * * * *